S. Rogers.
Horse Hay-Fork.
N° 59,139        Patented Oct. 23, 1866.
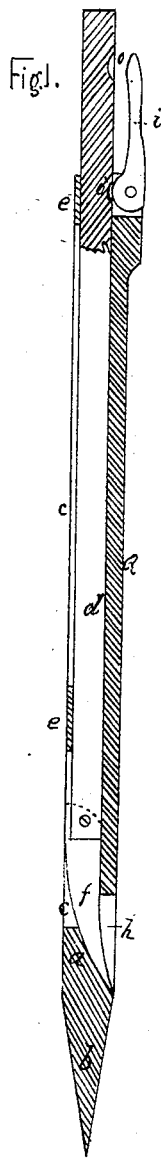
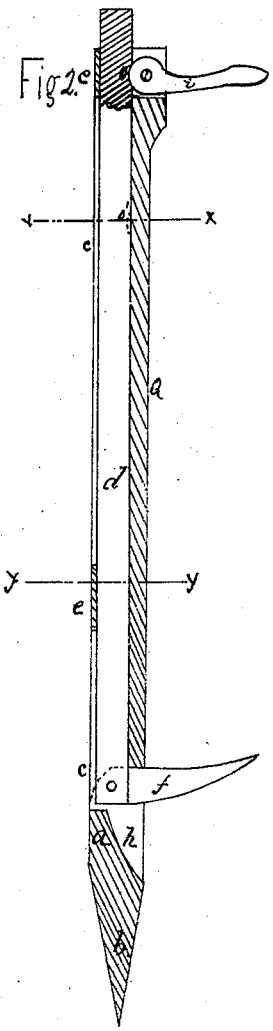
Witnesses.
Allan C. Bakewell
W. D. Lewis.
Inventor.
Seymour Rogers
by his attorney
W. Bakewell

UNITED STATES PATENT OFFICE.

SEYMOUR ROGERS, OF PITTSBURG, PA., ASSIGNOR TO LUMAN ROGERS.

IMPROVEMENT IN HORSE HAY-FORKS.

Specification forming part of Letters Patent No. 59,139, dated October 23, 1866.

*To all whom it may concern:*

Be it known that I, SEYMOUR ROGERS, of the city of Pittsburg, in the county of Allegheny and State of Pennsylvania, have invented a new and useful Improvement in Hay-Elevators; and I do hereby declare the following to be a full, clear, and exact description thereof, reference being had to the accompanying drawings, forming part of this specification, in which—

Figure 1 is a side view of my improved hay-elevator, with the barb or prong drawn into the sheath or penetrator, the penetrator and part of the barbed rod being shown in section. Fig. 2 is a similar view, showing the barb projected from the penetrator. Fig. 3 is a cross-section through $xx$, Fig. 2. Fig. 4 is a cross-section through $yy$, Fig. 2.

In the several figures like letters of reference denote similar parts.

To enable others skilled in the art to construct my improved hay-elevator, I will proceed to explain and describe it.

My elevator consists of a metallic penetrator or sheath, $a$, with its lower end pointed, as at $b$. It may be semi-cylindrical or U-shaped, with either rounded or square edges, or other similar shape in cross-section, the penetrator being made of one piece, and so shaped, by bending or otherwise, as to leave one side open, and yet combine lightness of weight with sufficient strength and rigidity to serve not only as a penetrator, but also to support the elevating-rod and hook or hooks when in use. Down one side, extending from the top to within a short distance of the pointed end, is a deep slot or rabbet, $c$, of uniform width and depth, sufficient to receive the barbed rod $d$, which extends up above the top of the penetrator or sheath $a$, and serves as the handle by which the elevator is operated. The hoisting-rope is attached to the top of the rod $d$. The rod $d$ slides up and down in the sheath $a$, and is kept in place laterally by the cross-pieces $e$ $e'$ over the rabbet $c$.

Pivoted to the lower extremity of the rod $d$ is a barb or prong, $f$, which, when the rod $d$ is drawn up in the sheath $a$, as in Fig. 1, extends below the termination of the rabbet $c$ into a slot, $h$, made in the sheath or penetrator $a$ on the opposite side from the rabbet $c$, so as to open into it, the shape of the slot $h$ being such that when the rod $d$ is pressed downward in the sheath $a$ the barb $f$ will be protruded from the sheath and held in the position shown in Fig. 2, about at right angles to the rod $d$, so long as the rod is prevented from rising; but as soon as the rod is raised it will draw the barb up with it into the sheath $a$.

On top of the penetrator $a$, to one side, is pivoted a short lever, $i$, having a cam-shaped or eccentric head, which, when the lever is turned down, as in Fig. 2, enters a notch, $o$ or $o'$, in the side of the rod $d$, and holds it in the position in which it may be set, the upper notch, $o$, being so situated as to be opposite the cam when the rod $d$ is depressed and the barb protruded, and the lower notch, $o'$, being opposite to the cam when the rod $d$ is raised and the barb withdrawn into its sheath.

The operation of my improved hay-elevator is as follows: When the rod $d$ is raised up in the sheath or penetrator $a$, as it will be naturally when suspended by a rope attached to the rod, and the barb withdrawn, as in Fig. 1, the penetrator is thrust into the hay to be raised. The rod is then depressed in the penetrator, which protrudes the barb $f$ into the hay sidewise. The lever $i$ is then turned down, and its cam, entering the notch $o$ in the rod, fastens it in place, not by pressing the rod against the cross-piece $e$, but by presenting an obstacle to the rising of the rod. The elevator, with its load supported on the barb $f$, is then raised by the hoisting-rope attached to the rod $d$, and when carried to the desired place the load is discharged simply by raising the lever $i$, releasing the cam from the notch $o$, when, the rod being no longer fixed in its position in the sheath, the barb $f$ drops down, and is withdrawn into the slot $h$ of the penetrator $a$.

The chief advantage of this my improvement in hay-elevators is the extreme simplicity of construction, and the fact that the entire strain is borne by the rod $d$ and barb $f$.

What I claim as my invention, and desire to secure by Letters Patent as an improvement in hay-elevators, is—

The combination of the elevating-rod $d$, (to which the hoisting-rope is attached,) having a barb, $f$, pivoted thereto, with the penetrator or sheath $a$ and cam-lever $i$, constructed and operating substantially as hereinbefore described.

In testimony whereof I, the said SEYMOUR ROGERS, have hereunto set my hand.

SEYMOUR ROGERS.

Witnesses:
W. BAKEWELL,
ALLAN C. BAKEWELL.